(12) United States Patent
Gabrielle (10) Patent No.: US 7,478,586 B2
(45) Date of Patent: Jan. 20, 2009

(54) ROTISSERIE ROASTER SMOKER

(75) Inventor: Victor Gabrielle, Albuquerque, NM (US)

(73) Assignee: Peacock Myers, P.C., Albuquerque, NM (US)

( * ) Notice: Subject to any disclaimer, the term of this patent is extended or adjusted under 35 U.S.C. 154(b) by 0 days.

(21) Appl. No.: 11/146,978

(22) Filed: Jun. 6, 2005

(65) Prior Publication Data

US 2006/0112837 A1    Jun. 1, 2006

Related U.S. Application Data

(60) Provisional application No. 60/576,957, filed on Jun. 4, 2004.

(51) Int. Cl.
    *A47J 37/00* (2006.01)
(52) U.S. Cl. ...................................... 99/340; 99/421 H
(58) Field of Classification Search .................. 99/339, 99/340, 419–421 V, 482, 444–450, 400, 401; 126/25 R, 41 R, 25 A, 9 R, 25 AA
    See application file for complete search history.

(56) References Cited

U.S. PATENT DOCUMENTS

| | | | | | |
|---|---|---|---|---|---|
| 2,705,450 | A | * | 4/1955 | Steinbook | 99/340 |
| 3,121,386 | A | * | 2/1964 | Persinger et al. | 99/443 R |
| 5,497,697 | A | * | 3/1996 | Promny | 99/427 |
| 5,878,739 | A | * | 3/1999 | Guidry | 126/25 R |
| 6,076,453 | A | * | 6/2000 | Hsu | 99/421 H |
| 6,138,553 | A | * | 10/2000 | Toebben | 99/421 H |
| 6,178,877 | B1 | | 1/2001 | Samuelson | |
| 6,330,855 | B2 | * | 12/2001 | Backus et al. | 99/447 |
| 6,405,640 | B1 | * | 6/2002 | Moreth | 99/334 |
| 6,609,512 | B2 | * | 8/2003 | Poe et al. | 126/25 A |
| 6,998,593 | B2 | * | 2/2006 | Lee | 219/752 |

* cited by examiner

*Primary Examiner*—Timothy F. Simone
(74) *Attorney, Agent, or Firm*—Deborah A. Peacock; Peacock Myers, P.C.; Philip D. Askenazy (57) ABSTRACT

A self-contained apparatus having a rotating flavor barrel for roasting, grilling, searing, rotisserie cooking, and smoking food. The apparatus is easily assembled, disassembled and transported making it ideal for "tailgate" cooking. The apparatus may be mounted on a wheeled frame or on a vehicle mounted frame. The apparatus can include an adjustable-height firebox and a smoker cover. Multiple accessories may be attached to the flavor barrel.

11 Claims, 10 Drawing Sheets

Fig. 10 ns of the present invention and, together with the description, serve to explain the principles of the invention. The drawings are only for the purpose of illustrating a preferred embodiment of the invention and are not to be construed as limiting the invention. In the drawings:

ROTISSERIE ROASTER SMOKER

CROSS-REFERENCE TO RELATED APPLICATIONS

This application claims the benefit of the filing of U.S. Provisional Patent Application Ser. No. 60/576,957, entitled "Rotisserie Roaster Smoker", filed on Jun. 4, 2004, and the specification thereof is incorporated herein by reference.

BACKGROUND OF THE INVENTION

1. Field of the Invention (Technical Field)

The present invention is a self-contained apparatus for roasting, grilling, searing, rotisserie cooking, and smoking food. The present invention is easily assembled, disassembled and transported making it ideal for "tailgate" cooking.

2. Background Art

Note that the following discussion refers to a number of publications and references. Discussion of such publications herein is given for more complete background of the scientific principles and is not to be construed as an admission that such publications are prior art for patentability determination purposes.

Many types of roasters, smokers, rotisseries, and grills are known in the art. Many use a rotating basket to roast chiles or other vegetables. One such portable roaster is disclosed in U.S. Pat. No. 6,178,877, incorporated herein by reference. Others use a grill or rotisserie for cooking meats. However, there is no present device which can provide all of these various cooking techniques with one simple device, which is either portable or easily assembled and disassembled.

SUMMARY OF THE INVENTION (DISCLOSURE OF THE INVENTION)

The present invention is a cooking apparatus comprising a barrel rotatably disposed on a frame, the barrel comprising a porous metal and at least one door; a motor for rotating the barrel; mounts for attaching accessories to the interior of the barrel; an adjustable height firebox; a flammable gas supply; and a removeable smoker cover.

An object of the present invention is to provide a cooking device that can roast chiles or other vegetables in a rotating basket and in addition be used as a rotisserie, grill, or smoker.

Another object of the present invention is to provide an easily adjustable heat source.

An advantage of the present invention is that it is self-contained and either portable without disassembly, or easily assembled and disassembled.

Another advantage of the present invention is that multiple cooking accessories may be used.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodi-

DESCRIPTION OF THE PREFERRED EMBODIMENTS (BEST MODES FOR CARRYING OUT THE INVENTION)

The present invention is a combination rotisserie, roaster, grill and smoker. It is preferably transportable and easy to assemble. It has a high quality of construction and a low cost.

Figure 1:
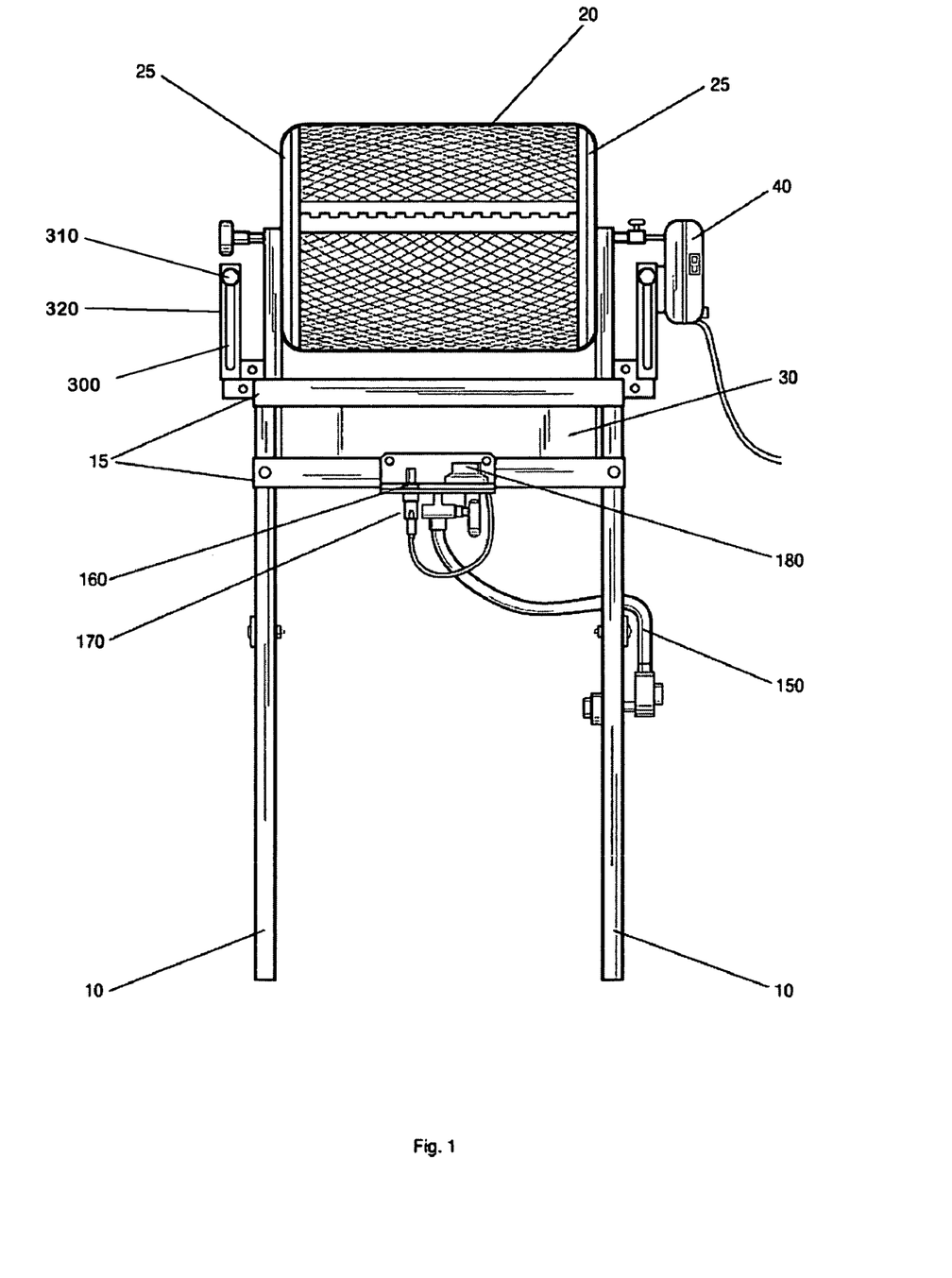
FIG. 1 shows the roaster smoker of the present invention.
Figure 2:
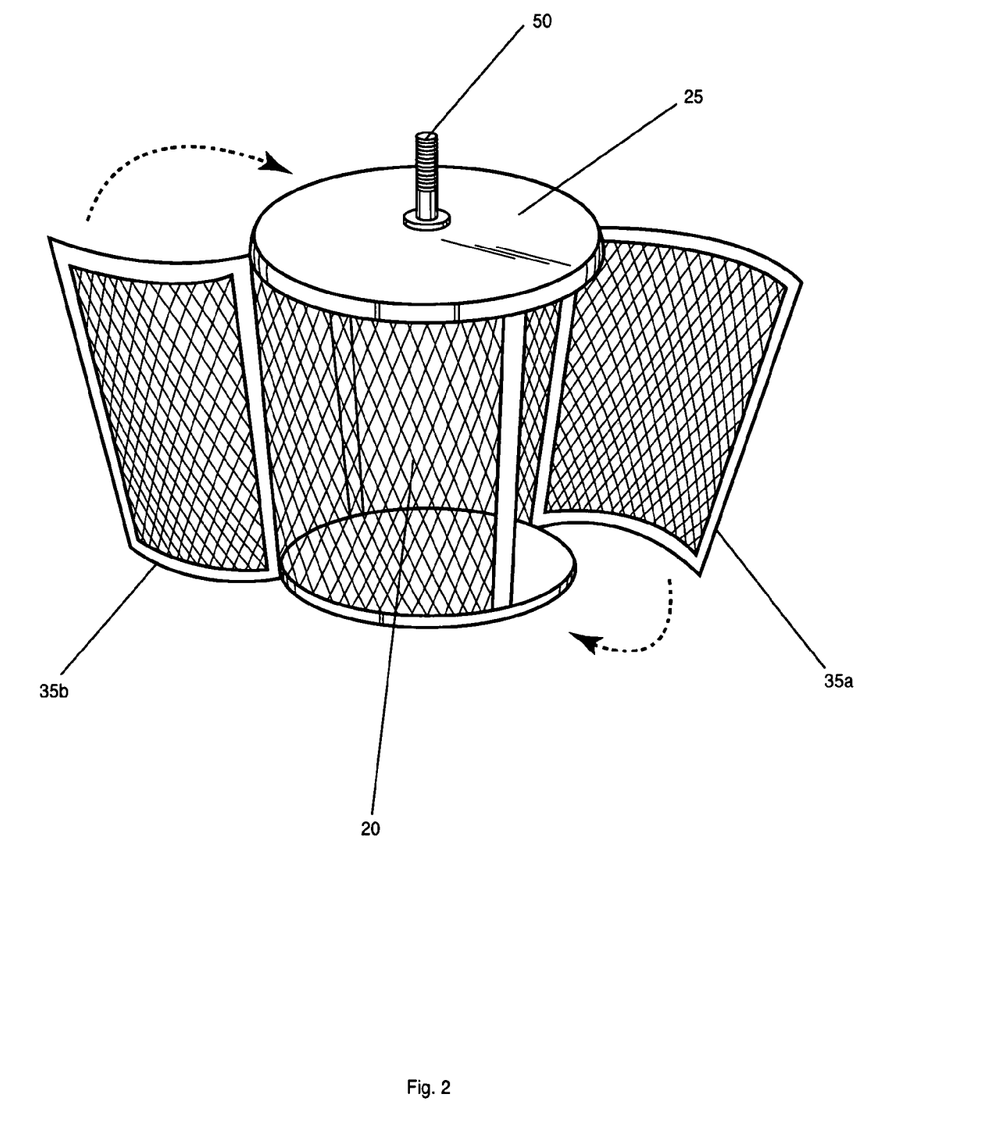
FIG. 2 shows the flavor barrel with both doors opened.

As shown in FIG. 1, the preferred embodiment of the present invention preferably comprises frame legs 10 and stabilizer bars 15 that provide support for the roasting, rotisserie, and smoking compartment (flavor barrel) 20 and firebox 30. Legs 10 and stabilizer bars 15 are preferably adjustable and preferably comprise metal or other similar materials. Alternatively, flavor barrel 20 and firebox 30 may be mounted on an integral frame, a wheeled frame for easy transport, or on a swing-out assembly attached to a vehicle such as a recreational vehicle, van, or sport utility vehicle. Flavor barrel 20 preferably comprises a drum, made of metal or similar material with two end plates 25 (e.g. metal) and cylindrical shafts attached to either face of each end plate. The drum preferably comprises metal mesh but may alternatively comprise metal with punched or drilled holes or other porous metal. As shown in FIG. 2, flavor barrel 20 comprises at least one, and preferably two, hinged mesh doors 35a, 35b, preferably made of metal for loading and unloading food and cooking accessories. The use of two doors is preferable to allow basting of both sides of a rotisserie food, such as ribs, during cooking and to balance the rotation of flavor barrel 20, thereby reducing wear on the motor used to rotate flavor barrel 20.

Flavor barrel 20 is preferably rotated by rotisserie motor 40, preferably comprising a 12V motor with stainless steel gears, which is preferably mounted on one of the frame legs. Alternatively, a roller, chain drive, or any other means may be used to rotate flavor barrel 20. Motor 40 is preferably electrical and is powered by any means, including but not limited to AC wall current, batteries, or direct current from a vehicle battery.

Figure 3:
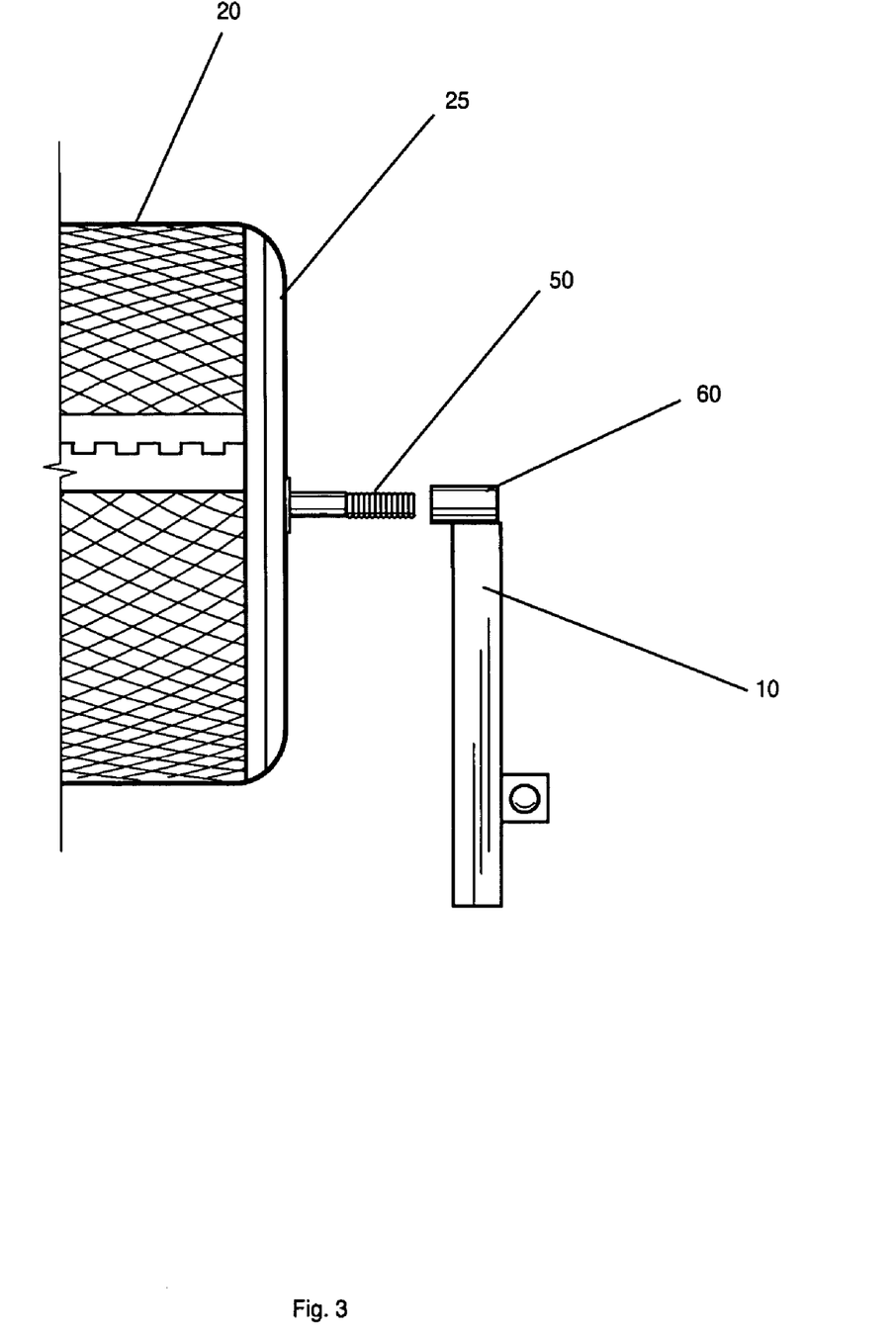
FIG. 3 shows a detail of a hub connector receiving a flavor barrel shaft.
Figure 4:
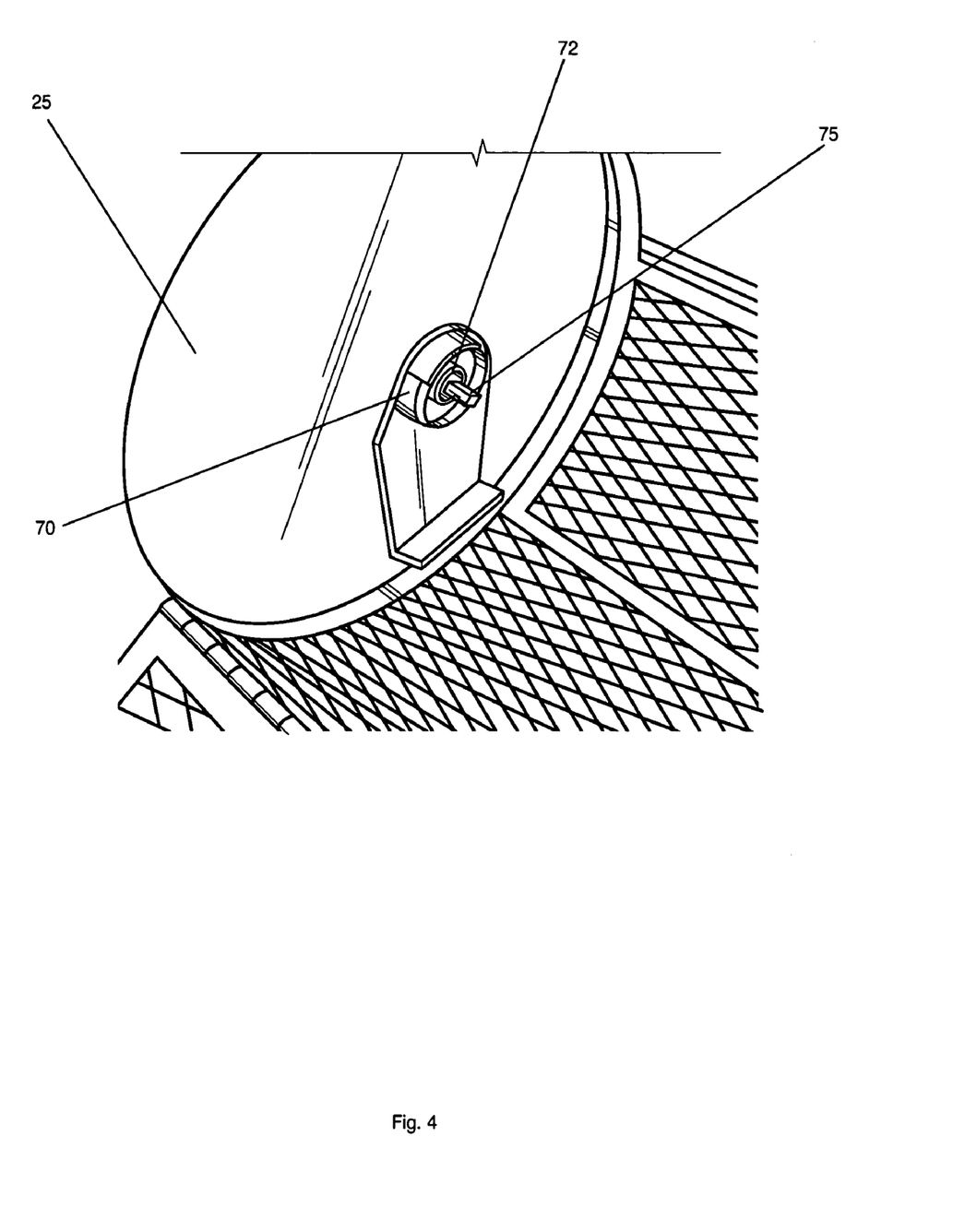
FIG. 4 shows a detail of an accessory mount.
Figure 5:
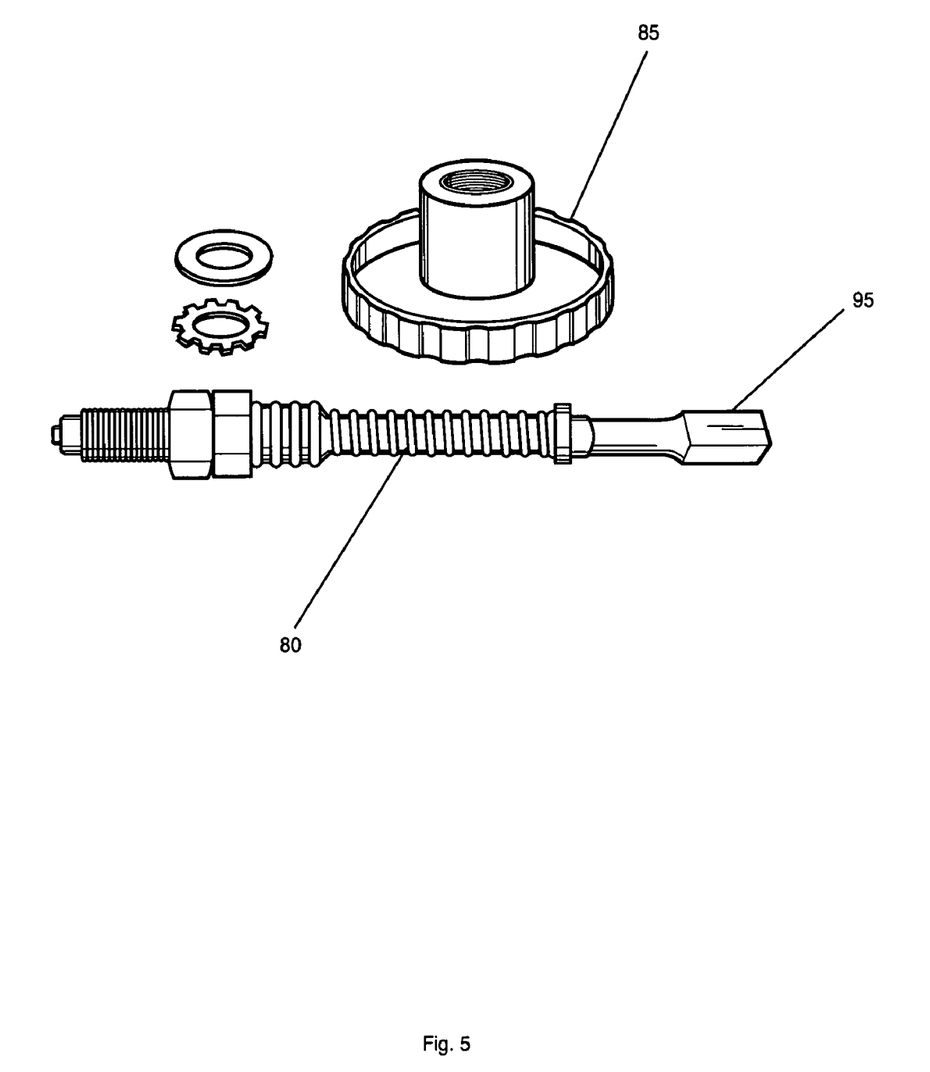
FIG. 5 shows the spring loaded retractable handle and shaft.

Flavor barrel 20 is preferably rotatably disposed on or in frame legs 10 (or any other frame) via two shafts 50, each of which extends from the outside center of end plate 25 and extends through, and rotates within, hub connector 60 attached to frame leg 10. As shown in FIG. 3, each hub connector 60 preferably comprises a hollow cylinder for receiving the shaft, but may optionally comprise an open semicircular tube in which the shaft rests. A short accessory mount 70, shown in FIG. 4, is preferably rotatably secured to the center of the interior of each of end plates 25. Accessory mount 70 preferably comprises cylindrical hub 72 and rod 75 having a square or other non-cylindrical cross section, although a cylindrical hub with a square headed end cap, or any equivalent design, may be used. Accessory mount 70 is preferably solid, although it alternatively may be hollow. One of the accessory mounts, preferably on the side opposite rotisserie motor 40, preferably protrudes through the corresponding end plate and comprises a spring loaded release handle 85 and shaft 80, shown in FIG. 5, for retracting the retractable accessory mount rod 95, thereby allowing accessories to easily be mounted in flavor barrel 20.

Flavor barrel 20 may be used without any accessories to roast chiles or other foods which tumble during roasting. Alternatively, a variety of rotating accessories may be mounted in the flavor barrel. Each rotating accessory preferably comprises at least one attachment end, preferably hollow, that mates with at least one of accessory mounts 70. The attachment end is preferably non-cylindrical in order to prevent the accessory rotating with respect to the accessory mounts. However, cylindrical accessory mounts and attachment ends may alternatively be used, preferably utilizing a set screw or the like to prevent such rotation. The rotating accessories are preferably installed by placing a first attachment end of the accessory over the motor side accessory mount. The spring-loaded release handle is preferably pulled out to allow enough room to position the accessory. The handle is released and the spring loaded retractable accessory mount rod 95 is guided into the second attachment end of the accessory. The spring holds it securely in place.

Figure 6:
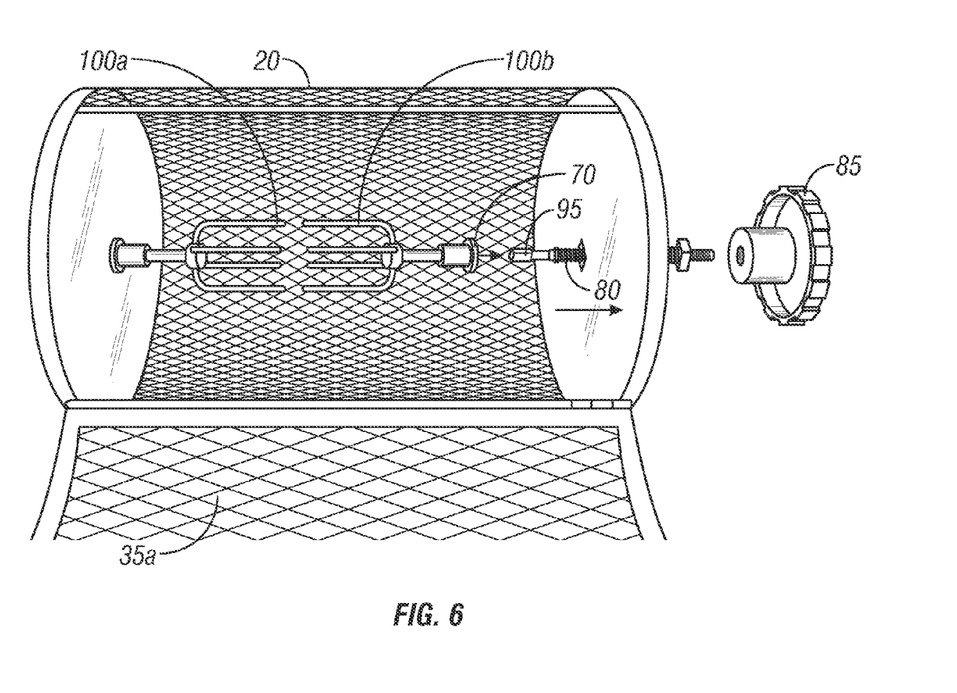
FIG. 6 is a detail of the rotisserie accessory.
Figure 7:
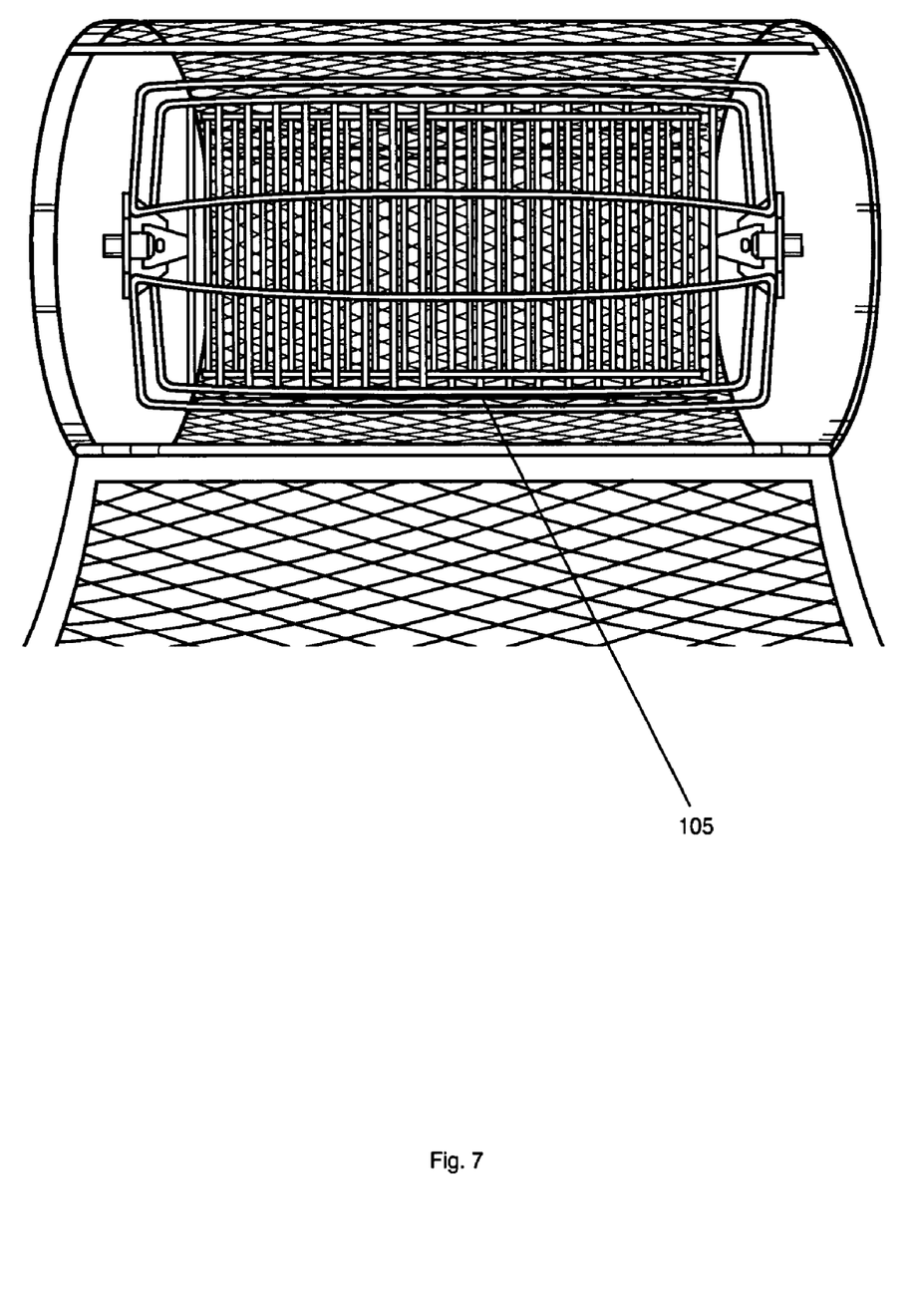
FIG. 7 is a detail of the rib rack accessory.
Figure 8:
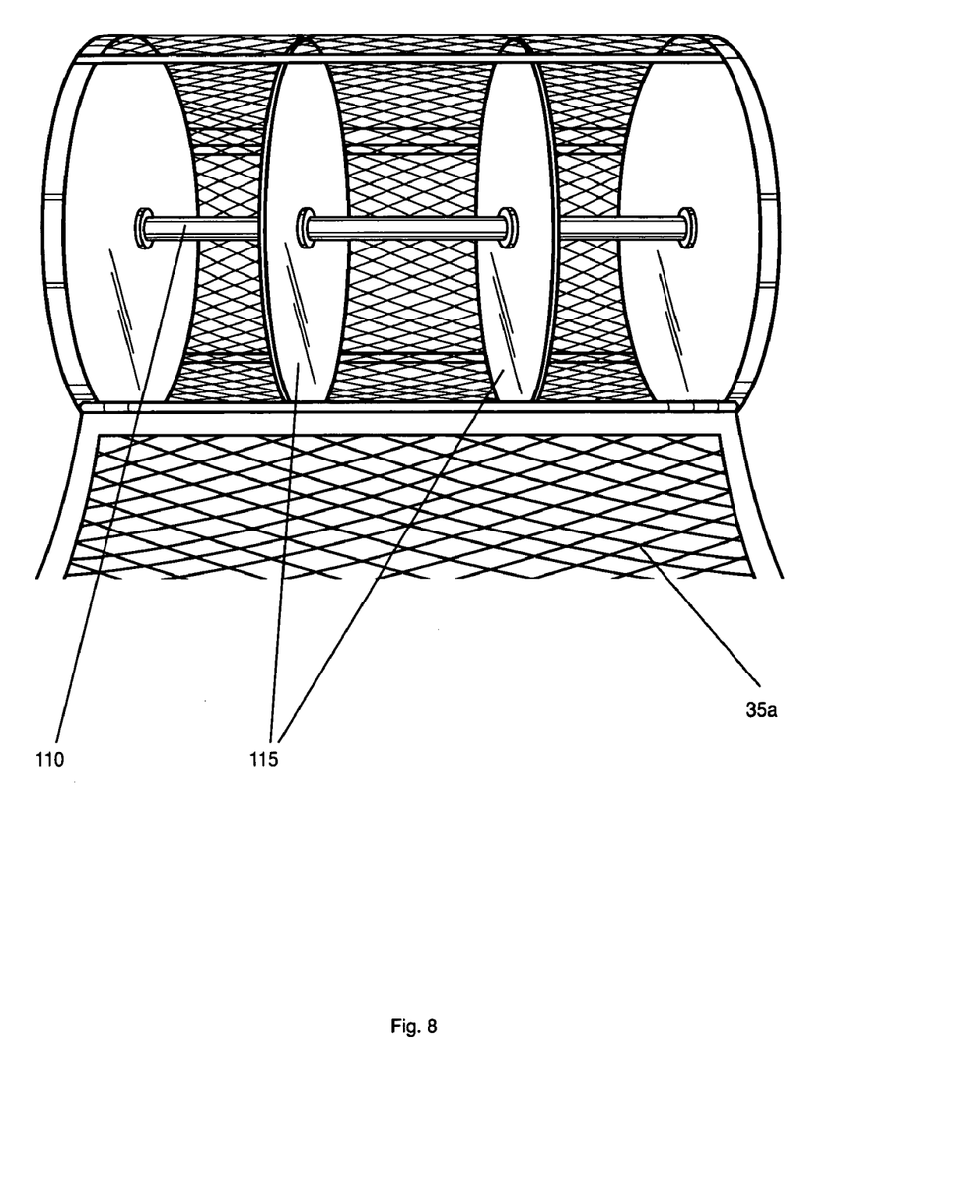
FIG. 8 is a detail of the partitioned roaster accessory.

Examples of accessories which rotate along with the flavor barrel include but are not limited to: rotisserie forks 100*a*, 100*b*, each comprising one or more prongs for securing a roast, large bird, or the like (shown in FIG. 6); rib rack 105, which comprises a closeable basket to hold ribs or the like (shown in FIG. 7); and a partitioned roaster as shown in FIG. 8, comprising shaft 110 with a plurality of spaced vertical discs 115 having a diameter slightly smaller than that of the flavor barrel, which allows different vegetables or other foods to be tumbled and roasted separately.

Figure 9:
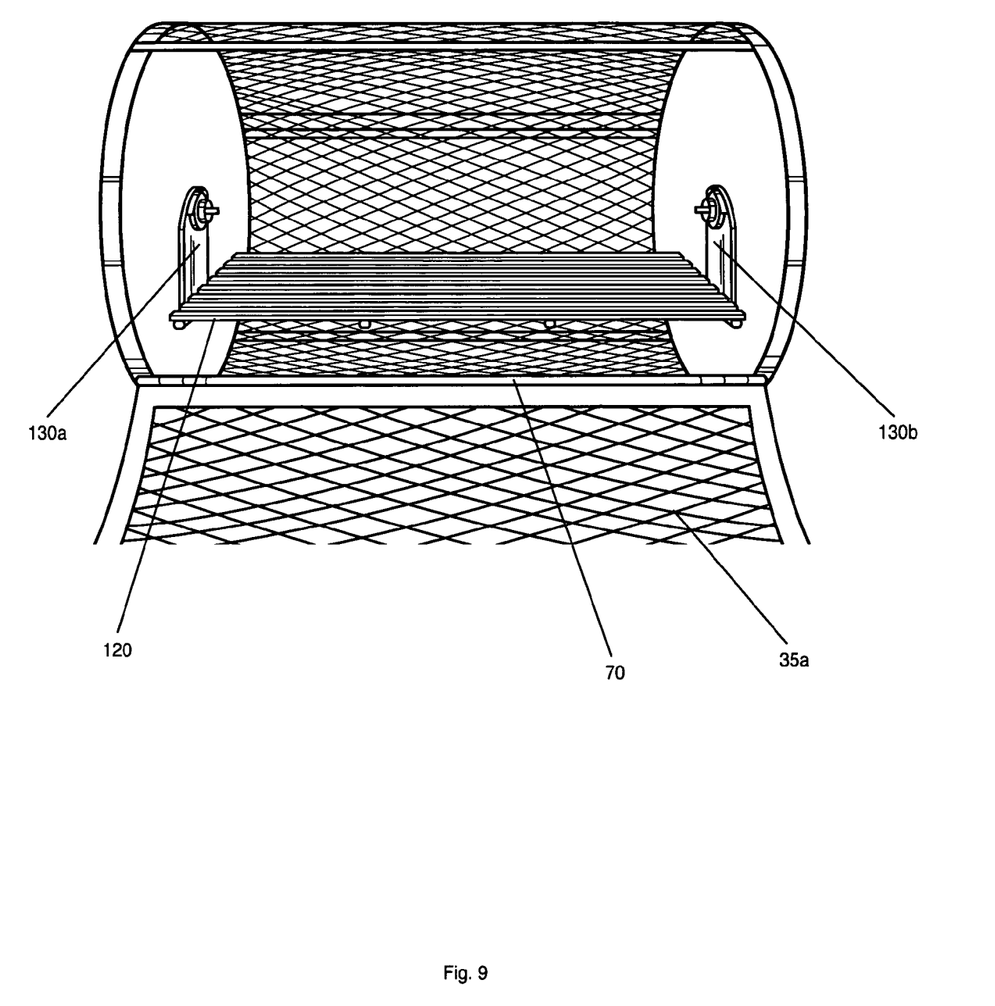
FIG. 9 is a detail of the hanging grill accessory.

A non-rotating hanging grill accessory, shown in FIG. 9, can be used to grill or sear foods which require high heat. Hanging grill 120 preferably is mounted inside flavor barrel 20 to supports 130*a*, 130*b* which hang and swing freely from accessory mounts 70. Supports preferably comprise heat-resistant bearings. Thus, hanging grill 120 remains horizontal and close to firebox 30 while flavor barrel 20 rotates. Preferably the mesh of flavor barrel 20 diffuses any flames from the firebox, minimizing flare-ups.

The present invention preferably comprises firebox 30 which is preferably located under flavor barrel 20 and is mounted to frame legs 10. The height of the firebox, and thus its distance from the food in flavor barrel 20, is preferably adjustable, using means known in the art, in order to control the cooking temperature. For example, firebox 30 may comprise support rods which are disposed in one of a plurality of vertically spaced diagonal slots in a fixture attached to frame legs 10. Preferably a fine height adjustment means is also provided, which can further raise or lower firebox 30, for example up to one inch, after a coarser height adjustment is made. Firebox 30 preferably comprises a standard liquid propane (LP) or natural gas burner and a grate. Fuel may be delivered through line 150 from a portable LP tank or a large permanent gas tank. Firebox 30 preferably comprises an ignitor bracket 160 for holding ignitor 170 and gas flow control 180. The flames from the burner may be used to directly cook foods in flavor barrel 20, although preferably indirect heat is produced by the use of ceramic grill media known in the art. Soaked hardwoods may be added on top of (or below) the grate for smoking, or adding smoke flavor to, the food. Other grilling materials may also be used, such as wood chips, flavor bars, charcoal, briquettes, and the like. If charcoal or briquettes are used, the gas fuel is optionally turned lower, or turned off, once the fuel is burning as desired.

Figure 10:
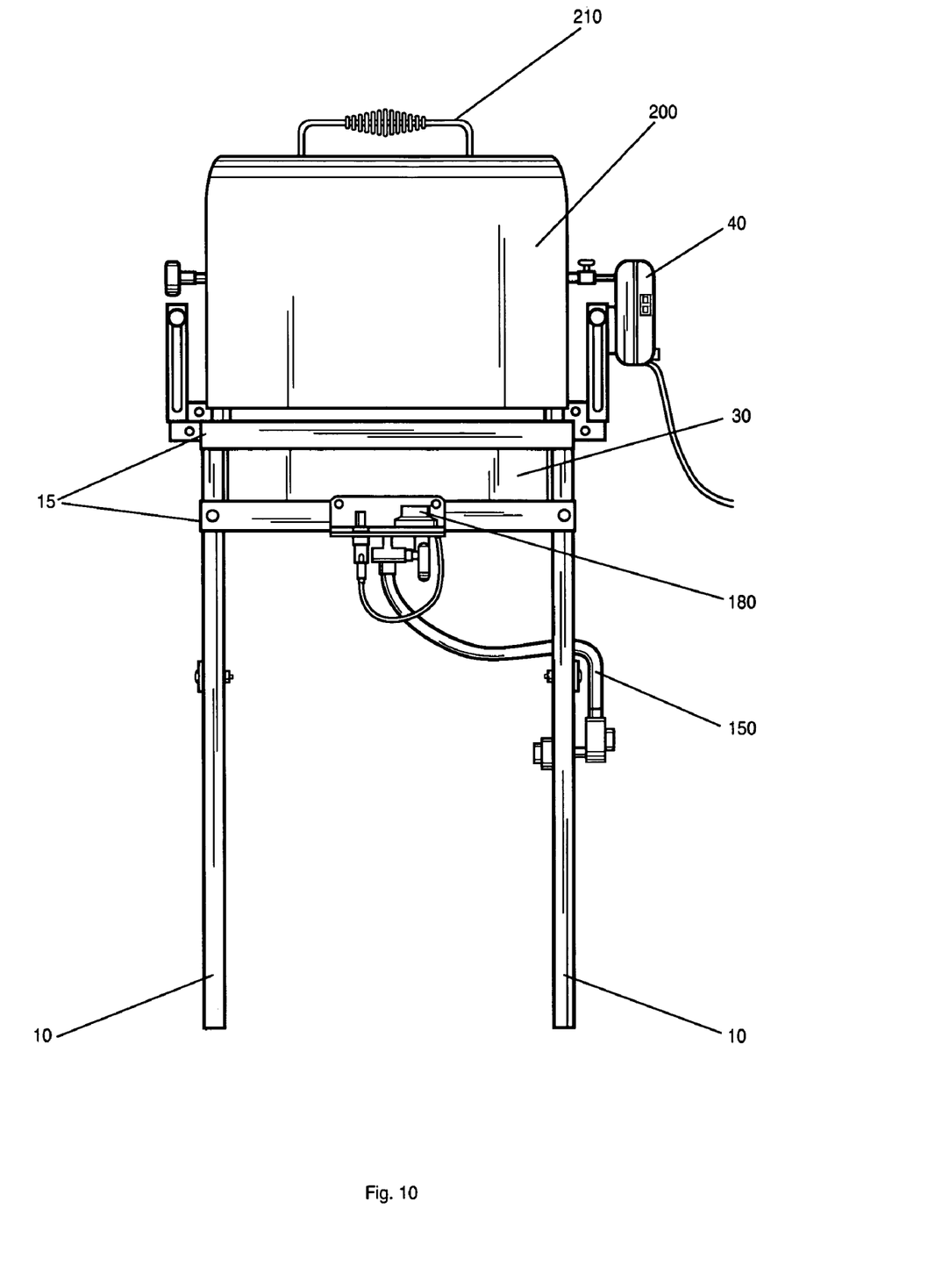
FIG. 10 shows a view of the present invention with the smoker cover in place.

The present invention may also be used as a smoker when smoker cover 200 is installed. Smoker cover 200, which is preferably a one-piece metal cover that covers flavor barrel 20 and preferably reaches down approximately to the top of firebox 30, thereby at least partially trapping smoke produced by firebox 30. Vent holes are located at the top of the cover, preferably on both the motor side and other side. Rotatable plates of metal or other suitable materials are preferably attached to smoker cover 200, e.g. with bolts and wing nuts. The amount of smoke vented can be adjusted by loosening the wing nuts and rotating the plates to cover more or less of the vent holes. Each end of smoker cover 200 preferably comprises a cutout which accommodates hub connectors 60, thereby allowing smoker cover 200 to rest on frame legs 10. Smoker cover 200 is preferably guided into place by raised strips (e.g. metal strips) on the hub connectors. Smoker cover 200 preferably comprises handle 210 and means for locking the cover to hub connectors 60, frame legs 10, or flavor barrel shafts 50, thereby permitting the cover to also be used as a carrying case.

EXAMPLE

A roaster was constructed in accordance with assembly instructions for the present invention which included the following:

The drive side and left side hub connector were identical pieces, except that the left side hub connector had an additional hole which allowed a short piece of solid rod to be pushed through it into a matching hole on the flavor barrel to keep the flavor barrel stationary while loading and unloading food and/or accessory attachments. The hub connectors were generally triangular in shape and consisted of three pieces of square tubing covered with sheet metal on both sides. There was a piece of square tubing centered and welded at a right angle in place approximately $1/3$ of the way up from the bottom. The same size hole as the interior of the square tubing continued through the inside sheet metal. This was the mounting bracket for the sliding firebox height adjuster. There were pre-drilled holes through the square tubing and parallel to the sheet metal cover through which carriage bolts were placed and secured with flat washers, lock washers, and nuts. There are four pre-drilled holes centered laterally with respect to the interior square tubing.

Carriage bolts were installed in the top two holes on each hub connector to act as stops when the legs were inserted. Holes in the legs matched up with the bottom two holes as did the slots on the top front and top rear stabilizer bars. All were secured using carriage bolts, lock washers, flat washers, and nuts. A bushing sat at the top of each hub connector to accept the shafts of the flavor barrel.

Carriage bolts were inserted through the two upper holes on the left side and the drive side hub connectors from the side of the connector towards the flavor barrel. The threaded shank of the carriage bolt protruded on the side that had the firebox adjuster mounting bracket. A flat washer, lock washer, and nut were installed on each carriage bolt and hand tightened. The legs were slid into the square tubing channel and matched to lower holes on the hub connectors with the top holes in the legs. A carriage bolt was inserted through each of the four holes, so the head of the bolt was on the side facing the flavor barrel. Washers or nuts were installed later to attach the front and rear top stabilizer bars.

There were six stabilizer bars: one on each side, a top and lower front, and a top and lower rear. First, the two side stabilizer bars were installed. One side was already attached to the leg. A carriage bolt was installed in the corresponding hole on the other leg with the head of the carriage bolt toward the outside. A flat washer was placed on the carriage bolt, as was a lock washer, and nut and these were hand tightened. The side stabilizer bar was rotated until the slot slipped down over the square shoulder of the carriage bolt. This step was repeated for the other side.

The flavor barrel was installed by sliding the outside-threaded shaft into the bushing on top of the drive side hub connector and the inside-threaded shaft into the bushing on top of the left side hub connector.

The top front stabilizer bar was installed by matching up holes on the end of the bar with holes in the hub connectors and securing with a flat washer, lock washer, and nut. These were hand tightened. This step was repeated for the top rear stabilizer bar. The lower front stabilizer bar was installed by first installing two carriage bolts in the remaining holes in the front legs with the heads of the bolts facing front. On each was placed a flat washer, lock washer, and nut and these were hand tightened. The lower front stabilizer bar had two slotted ends. The bar was slid down behind the head of the carriage bolts so the slots rested on the square shoulders of the carriage bolts. This step was repeated for the lower rear stabilizer bar. A wrench was used to tighten all previous connections. The flavor barrel was hand rotated during this process to ensure free movement. Once the flavor barrel was found to spin freely, the unit is square.

The left side spring-loaded accessory was installed by releasing the shaft and by placing the end with the spring on it into the inside-threaded shaft of the flavor barrel. This was tightened with a wrench and handle screwed on.

The drive side accessory shaft was installed by placing the longer end into the outside-threaded shaft of the flavor barrel. The nut, which was welded in place, was threaded on and tightened down. It was secured in place by tightening the set screw.

The drive motor was mounted onto the firebox adjuster bracket by matching up the holes on the motor with those on the bracket, inserting screws, and tightening. A little play was left to allow for adjustments. The square tubing of the mounting bracket 320 was slid inside the square tubing stub on the drive side hub connector. At the same time, the end of the accessory shaft was guided into the connector on the drive motor. The mounting bracket 320 was secured with a carriage bolt, flat washer, lock washer, and nut through the square tubing at the hub connector. The slotted square tubing adjustment slider 300 was inserted into the mounting bracket 320 from the bottom. The threaded end of the wooden handle assembly 310 was inserted through the hole at the top of the slider and secured from the back with a flat washer, lock washer, and nut. The installation of the left side firebox adjuster was similar, except that there was no motor on that side.

The ignitor bracket was placed in the bottom of the firebox, matched up with the mounting holes, and secured with screws. The ignitor was secured with the wire coming out the bottom of the firebox. The round tubing connected to the bottom of the burner bar was inserted through the hole in the bottom of the firebox. The burner bar was set into place, resting on the four brackets. The holes in brackets were matched with holes in the bottom of the firebox and secured with nuts and bolts. The firebox grill was set into the firebox. The firebox was placed under the flavor barrel and rested on the outside stabilizer bars while the fine tune adjustment assembly was installed.

The left side firebox fine tune adjustment handle was installed by inserting the threaded ends through the slotted adjustment plate and into the holes on the end of the firebox. A flat washer, lock washer, and nut were placed on each and they were tightened securely with a wrench. This step was repeated for the drive side installation. The top of the slotted fine tune adjustment plate ended with a plate that had two holes that matched a plate with two holes at the lower end of the firebox adjuster slider. The wooden handle of the firebox adjuster assembly was loosened to allow the slider to lower and the plates to match up. These were secured with carriage bolts, flat washers, lock washers, and nuts and tightened with a wrench. The flared firebox flange was placed on top of the firebox. The tabs at the bottom of the flange slid into the top of the firebox and held it in place.

The ignitor/gas control plate on the lower front stabilizer bar was installed by matching the holes and securing with small bolts, lock washers, flat washers, and nuts. The ignitor wire coming from the bottom of the firebox was attached to the wire coming from the bottom of the push-button ignition switch on the ignitor/gas control plate. The ends of the wires have connectors that slid together.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A cooking apparatus comprising:
    a barrel rotatably disposed on a frame, said barrel comprising a porous material and at least one door;
    a motor for rotating said barrel;
    an accessory disposed within said barrel which rotates during rotation of said barrel;
    at least one spring-loaded mount disposed inside said barrel connecting with said accessory for loading and unloading said accessory inside said barrel through said door; and
    a heat source.

2. The cooking apparatus of claim 1 wherein a distance of said heat source from said barrel is adjustable.

3. The cooking apparatus of claim 1 wherein said heat source comprises a firebox or a burner.

4. The cooking apparatus of claim 1 further comprising a smoker cover.

5. The cooking apparatus of claim 4 wherein said smoker cover also functions as a carrying case for said apparatus.

6. The cooking apparatus of claim 1 wherein said porous material comprises mesh.

7. The cooking apparatus of claim 6 wherein said mesh diffuses flames from said heat source.

8. The cooking apparatus of claim 1 wherein said accessory is chosen from the group consisting of a rotisserie fork, a closeable basket, and a partitioned roaster.

9. An apparatus for cooking comprising:
    a barrel rotatably disposed on a frame, said barrel reconfigurable to receive at least two removable cooking accessories selected from the group consisting of a rotisserie, a roaster, a grill and a smoker;

said barrel comprising a porous material and at least one door;

said accessories removably disposable within said barrel;

a motor for rotating said barrel;

at least one spring-loaded mount disposed inside said barrel connecting with said accessory for loading and unloading said accessories inside said barrel through said door; and a heat source.

10. The apparatus of claim 9 wherein said barrel is reconfigurable to receive at least three cooking accessories selected from the group consisting of a rotisserie, a roaster, a grill and a smoker.

11. The apparatus of claim 10 wherein said barrel is reconfigurable to receive at least four cooking accessories selected from the group consisting of a rotisserie, a roaster, a grill and a smoker.

\* \* \* \* \*